No. 731,890.

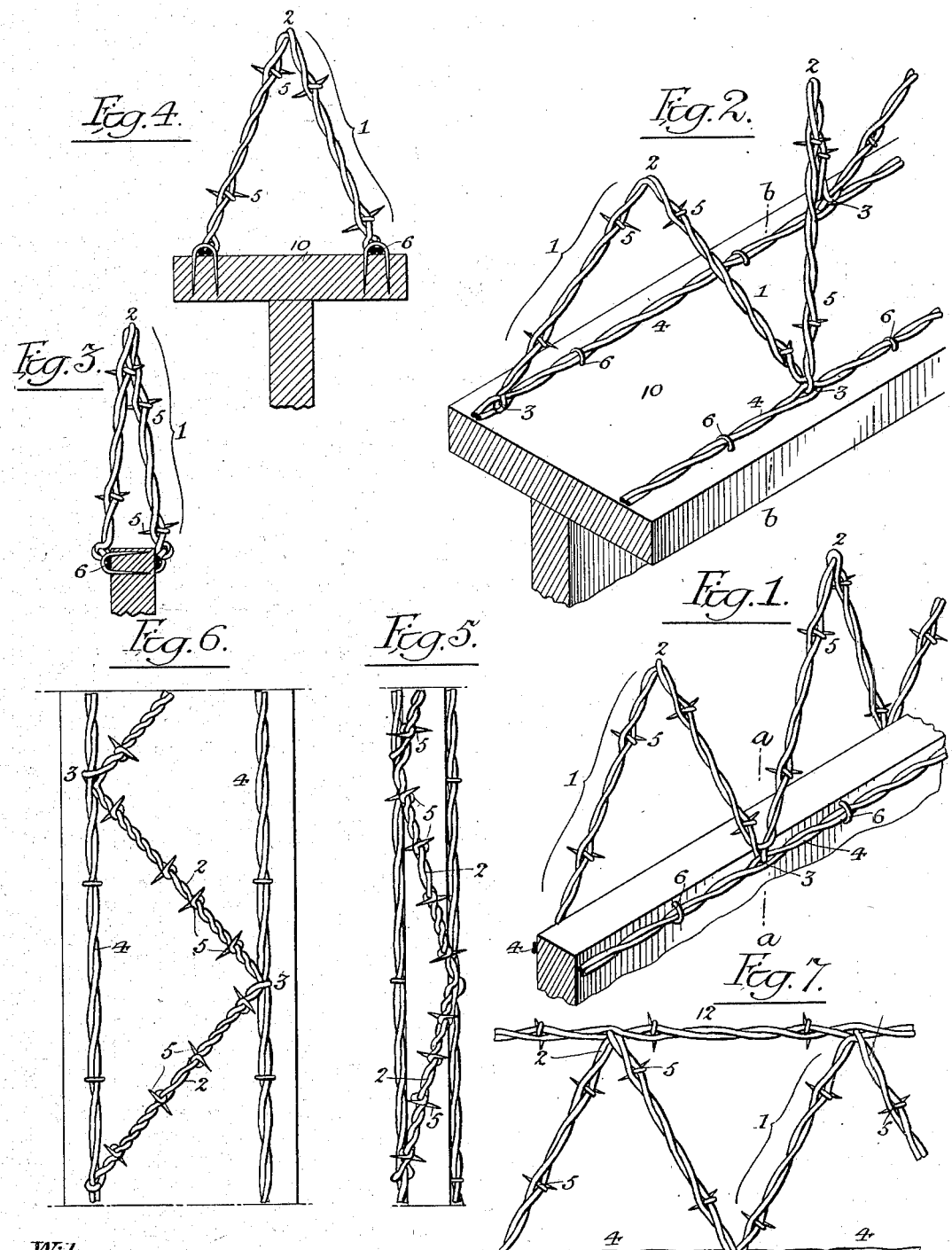

Patented June 23, 1903.

UNITED STATES PATENT OFFICE.

FRANK D. GREEN, OF PHILADELPHIA, PENNSYLVANIA.

BARBED-WIRE FENCE-TOP.

SPECIFICATION forming part of Letters Patent No. 731,890, dated June 23, 1903.

Application filed January 14, 1903. Serial No. 139,033. (No model.)

*To all whom it may concern:*

Be it known that I, FRANK D. GREEN, a citizen of the United States, residing in Philadelphia, Pennsylvania, have invented certain Improvements in Barbed-Wire Fence-Tops, of which the following is a specification.

My invention relates to supplementary tops or barriers to be placed upon fences for the purpose of keeping off trespassers or animals that may walk the same at night; and it consists of an improved structure of this character that is easy of manufacture and can be readily attached in place.

My invention is fully illustrated in the accompanying drawings, in which—

Figures 1 and 2 are perspective views illustrating the manner of using my improved fence-top. Fig. 3 is a cross-section on the line *a a*, Fig. 1. Fig. 4 is a cross-section on the line *b b*, Fig. 2. Figs. 5 and 6 are plan views, respectively, of the structure shown in Figs. 1 and 2; and Fig. 7 is a side elevation illustrating a modification of my invention.

The structure forming the subject of my invention is preferably made of ordinary commercial barbed wire and is intended to be secured directly to the top of the fence.

In the drawings herewith is shown a length of barbed wire 1, which is bent so as to form a series of convolutions or legs 2, to which may be secured at 3 the tie-wire 4. The wire 1 is of the ordinary barbed pattern, comprising strands of plain wire twisted together and having barbs 5 set at intervals.

It will be noticed that my improved fabric or structure may be manufactured in continuous lengths in the manner just described and is further capable of being flattened out and put up in reels, affording close stowage, as well as economy of space in shipment. The tie-wires 4 4 serve to regularly space apart the bent portions of the legs of the barbed wire, causing the structure to assume a neat and orderly appearance when put up and in use, as well as forming a substantial and homogeneous structure practically incapable of being dismembered or pulled apart or loosened by shrinkage or stress of weather. It may be secured with staples 6 to the sides of the fence, as shown in Figs. 1, 3, and 5, or if the fence is equipped with a top cap or strip, as shown at 10 in Figs. 2, 4, and 6, the staples may be driven down from above, and in some instances these staples may be long enough to pass entirely through the cap 10 and be clenched on the under side of the same. Under some conditions it may be desirable to space or secure the upper points of the V-shaped projections, and for this purpose a tie-wire or length of barbed wire may be arranged along the top of the same, as shown at 12 in Fig. 7.

A fence equipped with my improved structure presents the appearance shown in Figs. 1, 2, 3, and 4, forming an effectual barrier to cats and other animals walking along the top or to trespassers or evil-disposed persons from climbing over the same.

My fence-top may be manufactured in continuous lengths and sold from a reel in the manner in which ordinary woven-wire fencing is sold. It may be readily applied by the purchaser without the necessity of having to buy special tops for the fence, and it is self-supporting when applied and in use.

Having thus described my invention, I claim and desire to secure by Letters Patent—

1. As a new article of manufacture, a wire fence-top comprising an upper section having a series of bends forming upwardly-projecting members disposed in a staggered line, and a tie member connected to certain of said bends.

2. As a new article of manufacture, a wire fence-top comprising a continuous strand of barbed wire having a series of upwardly-projecting bends disposed in a staggered line and having connecting or tie wires secured to alternate ends of said bent portions.

3. As a new article of manufacture, a wire fence-top comprising a continuous strand of barbed wire having a series of legs formed by bending the wire, said legs being spread in opposite directions to straddle the fence, and independent continuous tie members connecting the ends of said legs on opposite sides of the fence.

4. As a new article of manufacture, a wire fence-top comprising a continuous strand of barbed wire having a series of legs formed by bending the wire, said legs being spread in opposite directions to straddle the fence, independent continuous tie members connecting the ends of said legs on opposite sides of the fence, and a tie member connecting the apices of said legs.

5. As a new article of manufacture, a wire fence-top consisting of up-and-down convolutions of barbed wire, said convolutions being arranged in a staggered line and having their alternate ends connected by tie members.

In testimony whereof I have signed my name to this specification in the presence of two subscribing witnesses.

FRANK D. GREEN.

Witnesses:
EUGENE HUNTER,
J. H. DENWORTH.